United States Patent

Morita et al.

[11] 4,021,163
[45] May 3, 1977

[54] ROTARY-PISTON ENGINE HOUSING

[75] Inventors: Yasuyuki Morita; Hiroshi Kodama, both of Hiroshima, Japan

[73] Assignee: Toyo Kogyo Co., Ltd., Japan

[22] Filed: Oct. 6, 1975

[21] Appl. No.: 620,197

[30] Foreign Application Priority Data

Oct. 11, 1974 Japan ............ 49-123045[U]
Mar. 3, 1975 Japan ............ 50-29284[U]

[52] U.S. Cl. ............... 418/83; 418/152; 418/178; 418/179; 123/8.01
[51] Int. Cl.² ............... F01C 21/06; F01C 21/10
[58] Field of Search ........... 418/83, 152, 178, 179; 123/8.01, 8.45, 191 A, 193 C; 60/901

[56] References Cited
UNITED STATES PATENTS

| | | | |
|---|---|---|---|
| 3,359,956 | 12/1967 | Bentele | 418/179 |
| 3,644,069 | 8/1969 | Stewart | 418/179 X |
| 3,888,606 | 6/1975 | Uy | 418/179 |
| 3,898,804 | 8/1975 | Morita | 123/8.45 |
| 3,921,593 | 11/1975 | Lamm | 418/83 X |

Primary Examiner—Carlton R. Croyle
Assistant Examiner—Leonard Smith
Attorney, Agent, or Firm—Wenderoth, Lind & Ponack

[57] ABSTRACT

A housing structure for a rotary piston internal combustion engine comprises at least one peripheral casing having an epitrochoidal surface formed therein, and a pair of end walls connected to each other with the peripheral casing situated therebetween. Portions of the end walls and peripheral casing which are simultaneously exposed to one of the working chambers in which the expansion stroke is taking place, that is, the expansion chamber, has therein respective heat insulating layers so as to substantially avoid a possible reduction of the temperature of the exhaust gas staying within the expansion chamber.

12 Claims, 9 Drawing Figures

ROTARY-PISTON ENGINE HOUSING

BACKGROUND OF THE INVENTION

The present invention generally relates to a rotary piston internal combustion engine and, more particularly, to an engine housing structure for the rotary piston internal combustion engine.

To minimize the emission of noxious unburned components of an exhaust gas from a rotary piston internal combustion engine to the atmosphere, the recent trend has been to employ an exhaust gas purifying device, such as a thermal reactor, in the exhaust system of the rotary piston internal combustion engine. As is well known to those skilled in the art, combustion of the unburned components of the exhaust gas within the thermal reactor is brought about by the effect of the elevated temperature of the exhaust gas emerging from the rotary piston internal combustion engine. Therefore, the higher the temperature of the exhaust gas introduced into the thermal reactor, the more effective the combustion of the unburned exhaust gas components brought about within the thermal reactor.

In view of the operating characteristic of the thermal reactor currently used, various attempts have heretofore been made to avoid any excessive reduction of the temperature of the exhaust gas to be eventually introduced into the thermal reactor, which may result in ineffective combustion or a failure to reburn the unburned exhaust gas components within the thermal reactor. One of these attempts is to minimize, or substantially eliminate, the heat transfer to the forcibly cooled engine housing from the exhaust gas, by insulating the exhaust passage formed in the engine housing, such as by the use of a tubular insert inserted into the exhaust passage with an adiabatic space formed around said tubular insert, or by the use of a sleeve of heat insulating material pressure-fittedinto the exhaust passage.

The above described conventional technique is satisfactory insofar as the temperature of the exhaust gas flowing through the exhaust passage within the engine housing is concerned. However, considering the whole process of flow of the exhaust gas, the mere provision of the tubular insert or sleeve in the exhaust passage is insufficient in the sense that the conventional technique does not satisfactorily avoid any reduction of the temperature of the exhaust gas which occurs prior to the exhaust gas entering the exhaust passage. As is well known to those skilled in the art, in a rotary piston internal combustion engine, the contact area between the exhaust gas in one of the variable-volume working chambers and the interior wall surface of the engine housing facing said one of the working chambers is so large that the temperature of the exhaust gas at the time of its generation may readily be lowered at the time the exhaust gas is ready to enter the exhaust passage since the engine housing is forcibly cooled by a fluid coolant which may be either air or liquid.

Moreover, the thermal reactor currently used is such that satisfactory and effective combustion of the unburned exhaust gas components, if the temperature of the exhaust gas is sufficiently high, takes place with a relatively small amount of the unburned components introduced thereinto, but will require a relatively large amount of the unburned components if the temperature of the exhaust gas is relatively low. Because of an in consideration of this operating characteristic of the thermal reactor, in order to avoid a possible failure to reburn, or otherwise carry out an ineffective combustion of, the unburned exhaust gas components within the thermal reactor due to the reduced temperature of the exhaust gas, a relatively enriched air-fuel mixture has heretofore been supplied into the engine. This has been considered one of the major causes of the high consumption of fuel in the rotary pistion internal combustion engine the exhaust system of which includes such a thermal reactor. Since combustion of the unburned exhaust gas components within the thermal reactor may be said to be initiated by a process of 'self-ignition' relying, not solely, but mostly, on the elevated temperature of the exhaust gas, reduction in temperature of the exhaust gas, inter alia, adversely affects on the amount of fuel consumed by the rotary piston internal combustion engine.

SUMMARY OF THE INVENTION

Accordingly, the present invention has for its essential object to provide an improved engine housing structure for a rotary piston internal combustion engine, wherein a heat insulating means is formed in the engine housing to minimize, or substantially eliminate, any possible reduction of the temperature of the exhaust gas which still remains within one of the working chambers under in which the expansion stroke is taking place, thereby substantially eliminating the disadvantages hereinbefore described.

Another important object of the present invention is to provide an improved engine housing structure of the type referred to above, which contributes to reduction of the amount of fuel to be consumed by the rotary piston internal combustion engine.

A further important object of the present invention is to provide an improved engine housing structure of the type referred to above, which contributes to ready warm-up of the thermal reactor which is necessary to bring the thermal reactor into an operable condition.

A still further object of the present invention is to provide an improved engine housing structure of the type referred to above, which can readily be manufactured with no complicated modification required in the conventionally employed manufacturing procedures and without incurring an unreasonable increase of the manufacturing cost.

As is well understood by those skilled in the art, the typical rotary piston internal combustion engine comprises a housing structure having axially spaced end walls and a peripheral or center casing interconnecting the end walls to form a cavity therebetween, and a triangular or other shaped multi-sided rotary piston rotatably accomodated within said cavity and rotatably mounted on an eccentric portion of a power output shaft which extends axially through the center of the cavity and coaxially journalled in the end walls of the housing structure so that, during operation of the engine, the rotary piston undergoes a planetary motion thereby rotating the power output shaft about the axis of said shaft. The peripheral casing has an epitrochoidal-shaped inner surface and has at least two circumferentially spaced, inwardly extending lobes.

For the fluid-cooled rotary piston interanl combustion engine, the peripheral casing may be a double-walled structure, the inner and outer walls being spaced apart by rib members defining passages therebetween for the flow of the coolant. Alternatively, the peripheral casing may have formed therein a plurality of bores for the flow of the coolant. On the other hand, the end walls are hollow structures having coolant passages with apertures formed adjacent the periphery of each end wall, which apertures are in communication with the passages or bores in the peripheral casing. The path of flow of the coolant is normally through the passages in one end wall, through the passages or bores in the peripheral casing, and then into the passages in the other end wall. The flow path may change direction in the end walls and pass back and forth several times through alternating groups of passages in the peripheral casing, as is well known to those skilled in the art.

In any event, in this rotary piston internal combustion engine, the four strokes of intake, compression, power or expansion and exhaust are carried out around the rotary piston when the engine is running. At this time, each of a plurality of working chambers respectively defined within the cavity between arcuate flanks of the shaped rotary piston and the epitrochoidal inner surface of the peripheral casing is successively conditioned in the intake, compression, power or expansion and exhaust strokes and varies in volume as the shaped rotary piston undergoes the planetary motion with its rotor apexes continuously sweeping, through corresponding apex seals, along the epitrochoidal inner surface of the peripheral casing.

With the above in mind, according to the present invention, a heat insulating means is provided in respective portions of the end walls and peripheral casing which are simultaneously exposed to one of the working chambers, then in which the expansion stroke is taking place due to the relative position of the rotary piston within the housing cavity, so as to substantially avoid, or otherwise minimize, a possible reduction of the temperature of the exhaust gas staying within said one of the working chambers.

More specifically, one of the working chambers in which the expansion stroke is taking place due to the relativeposition of the rotary piston, which is hereinafter referred to as an expansion chamber, like any of the other working chambers, varies in volume depending upon the relative position of the rotary piston within the housing cavity. This expansion chamber attains a minimum volume at the time corresponding to the end of compression of an air-fuel mixture and the start of expansion of the air-fuel mixture which has been gasified by the combustion to eventually form an exhaust gas and, on the other hand, a maximum volume at the time corresponding to the end of expansion of the gasified air-fuel mixture, that is, the exhaust gas, it being understood that at the end of expansion of the gasified air-fuel mixture the exhaust port may be opened either partially or completely. In terms of the position of the rotary piston, the minimum volume in the expansion chamber is achieved immediately after one of the rotor apexes, opposed to the one of the rotor flanks which creates a combustion chamber in cooperation with an adjacent portion of the epitrochoidal inner surface, which adjacent portion of said epitrochoidal inner surface includes one of the circumferentially spaced lobes, has moved past the other of the circumferentially spaced lobes on the epitrochoidal inner surface. On the other hand, the maximum volume in the expansion chamber is achieved when said one of said rotor apexes is, during continued rotation of the rotary piston in one direction, brought into alignment with the major axis of the epitrochoidal shape and when another one of the rotor apexes preceding said one rotor apex with respect to the direction of rotation of said rotary piston is held in position to open the exhaust port either partially or completely. It is to be noted that, as is well known to those skilled in the art, the major axis referred to above extends through the center of the epitrochoidal shape, that is, the center of the power output shaft, at right angles to the minor axis which is drawn across said center between the circumferentially spaced lobes in the peripheral casing.

However, since the temperature of the gasified air-fuel mixtue at the initial state of expansion thereof is quite high and, particularly, considerably higher than the lowermost limit of temperature necessary to effect re-combustion of unburned components of the subsequently emitted exhaust gas within the thermal reactor, the heat insulating means according to the teachings of the present invention need not be provided in those portions of the end walls and peripheral casing which are exposed to the entire expansion chamber, or otherwise portions of the end walls and peripheral casing which are adjacent one or more ignition plugs will be heated excessively.

BRIEF DESCRIPTION OF THE DRAWING

In any event, these and other objects and features of the present invention will become apparent from the following description taken in conjunction with preferred embodiments thereof with reference to the accompanying drawings, in which.

DETAILED DESCRIPTION OF THE INVENTION

Figure 1:
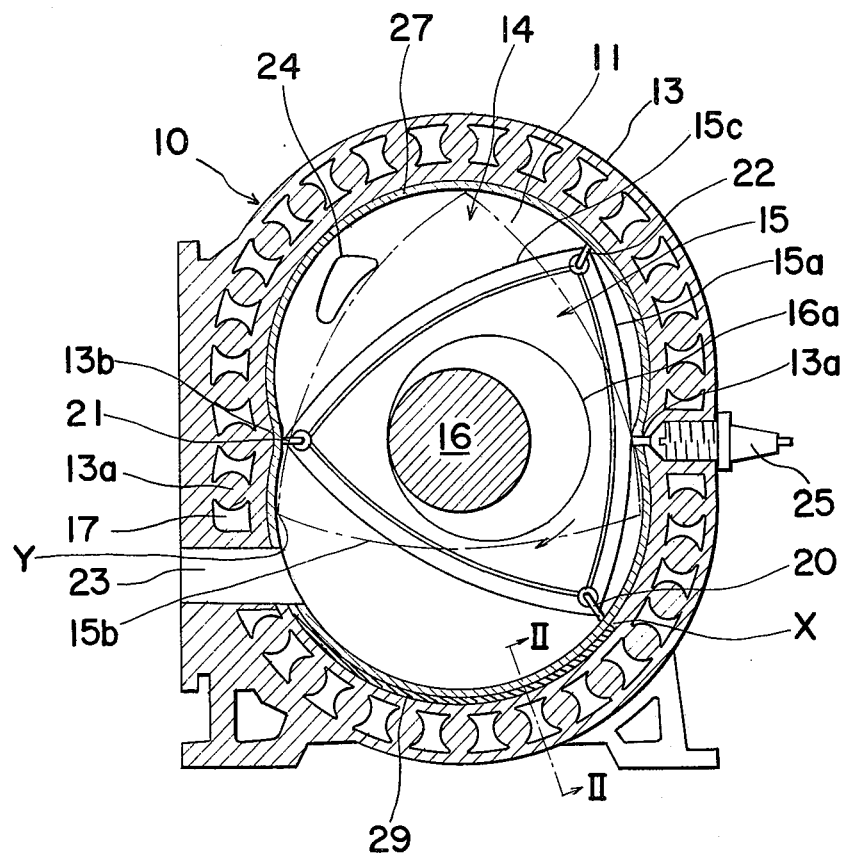
FIG. 1 is a schematic cross sectional view of an engine housing structure, with a rotary piston therein, for a rotary piston internal combustion engine according to a first preferred embodiment of the present invention, which view is take n at right angles to the longitudinal axis of a power output shaft of the engine.

Before the description of the present invention proceeds, it should be noted that like parts are designated by like reference numerals throughout the accompanying drawings. In addition, partly because the construction and operation of the rotary piston internal combustion engine are disclosed in various publications and literature, including numerous published patent specifications and, therefore, are well known to those skilled in the art and partly because the various parts of the rotary piston internal combustion engine have already been described above, some of these parts of the engine, which do not constitute the subject matter of the present invention, are hereinafter enumerated for the sake of brevity in reference to the corresponding reference numerals taken from the accompanying drawings:

10: Housing structure for the rotary piston internal combustion engine.

11 and 12: End walls, respectively, of the housing structure 10.

13: Peripheral casing of the housing structure 10.

14: Cavity. This cavity is defined within the peripheral casing 13 and between the end walls 11 and 12.

15: Substantially triangular rotary piston. This rotary piston has three arcuate flanks respectively designated by 15a, 15b and 15c.

16: Power output shaft of the rotary piston internal combustion engine. This power output shaft has an eccentric portion 16a on which the rotary piston 15 is mounted.

17: Bores forming the coolant passages in the peripheral casing 13. These bores or coolant passages are separated from each other by the rib-like portions generally indicated by 13a.

18 and 19: Respective sets of coolant passages in the end walls 11 and 12.

These coolant passages 17 to 19 so far illustrated constitute an axial-path coolant flow system in contrast to a circumferential-path coolant flow system, both being well known to those skilled in the art.

20, 21 and 22: Respective apex seals. These apex seals are radially movably carried by the rotary piston 15 at corresponding apex portions thereof and are permanently held in sliding contact with the epitrochoidal inner surface of the peripheral casing 13 thereby dividing the cavity 14 into a plurality of working chambers.

23: Exhaust passage. This exhaust passage is, in the instance as shown, formed in the peripheral casing 13 and has one end adapted to be coupled to a thermal reactor (not shown) and the other end formed into an exhaust port opening towards the cavity 14 and, more particularly, towards one of the working chambers in which the exhaust stroke is taking place. In a modified version, this exhaust passage may be formed in one or both of the end walls 11 and 12.

24: Intake port. This intake port is, in the instance as shown, formed in one of the end walls, for example, the end wall 11. In a modified version, this intake port may be formed in the peripheral casing 13 or in each of the end walls 11 and 12. In either case, this intake port is adapted to introduce an air-fuel mixture therethrough into the cavity 14 and, more particularly, into one of the working chambers in which the intake stroke is taking place.

25: Ignition plug. The rotary piston internal combustion engine so far illustrated employs a single ignition plug. However, it may employ a plurality of ignition plugs, for example, a combination of leading and trailing ignition plugs.

With reference to the accompanying drawings, the peripheral casing 13 is depicted as having an epitrochoidal inner surface lined with a metallic liner 27. This metallic liner 27 has applied to one surface thereof a layer 28 of hard chromium or any other known material by means of an electroplating technique for the purpose known to those skilled in the art, and has the other surface firmly interlocked to the peripheral casing 13 except for the portion of said other surface which is interlocked with the peripheral casing 13 through a heat insulating means provided in accordance with the teachings of the present invention as will subsequently be described. The metallic liner 27 may be made of any known ferrous material such as iron, cast iron or steel.

Figure 3:
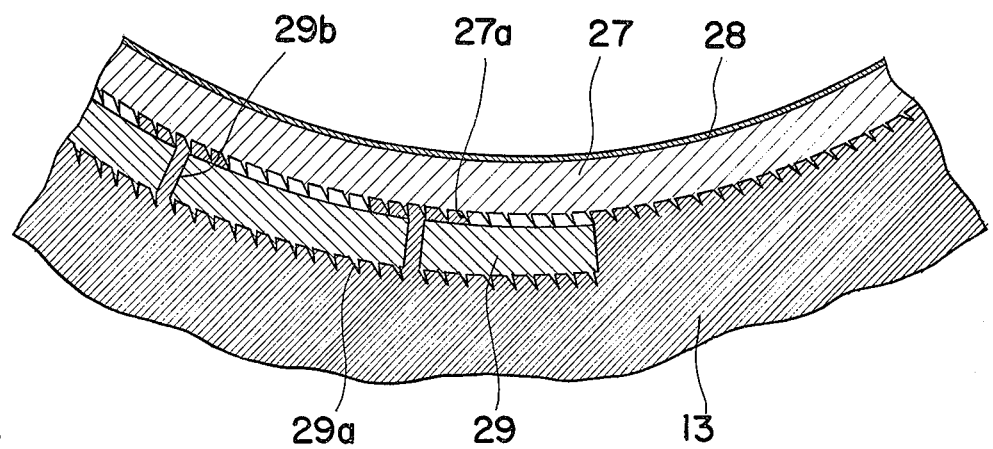
FIG. 3 illustrates an essential portion of the engine housing structure of FIG. 1, showing the details of a heat insulating element embedded in the housing structure in a definite position.

The entire outer peripheral surface of the metallic liner 27 opposed to the chromium-plated inner surface has, as best shown in FIG. 3, surface irregularities, generally indicated by 27a, which are integral with said outer peripheral surface of said metallic liner 27. These surface irregularities may be in the form of teeth, tipped projections, substantially T-shaped projections, thorns or any other projections and can readily be formed by any known method such as by means of knurling, pitting, stamping or outwardly raising the skin of the liner 27.

Manufacture of the metallic liner 27 encircled by the peripheral casing 13 can readily be carried out by any known method. One method may be an application of the method substantially disclosed in the U.S. Pat. No. 3,083,424, patented on Apr. 2, 1963, and is to first spray molten metal onto an epitrochoidal shaped core to form a sprayed metal coating which ultimately forms the metallic liner 27, then to place the core with the sprayed metal coating therearound in mold cavity after the surface irregularities 29a have been formed on the outer surface of the sprayed metal coating, and finally to pour, for example, molten aluminum alloy therearound for forming the peripheral casing 13. Another method is to shape a metallic strip of definite length, which ultimately forms the metallic liner 27, into an epitrochoidal shape with both ends seamlessly joined together before or after the surface irregularities 27a have been formed on one surface thereof, subsequently to place the shaped metallic strip in a mold cavity and finally to pour aluminum alloy therearound forming the peripheral casing 13.

According to any of these methods, as shown in the right-hand part of FIG. 3, molten aluminum alloy has penetrated deep into the interstices among these surface irregularities 27a, thereby achieving a firm mechanical interlock between the metallic liner 27 and the peripheral casing 13. It is to be noted that these interstices defined by the surface irregularities 27a communicate with each other.

The peripheral casing 13 having been described as being provided with the metallic liner 27, the sliding contact between the apex seal 20, 21 and 22 on the rotary piston 15 and the epitrochoidal inner surface of the peripheral casing 13 is to be understood as having been made with the chromium-plated inner surface of the metallic liner 27.

Figure 2:
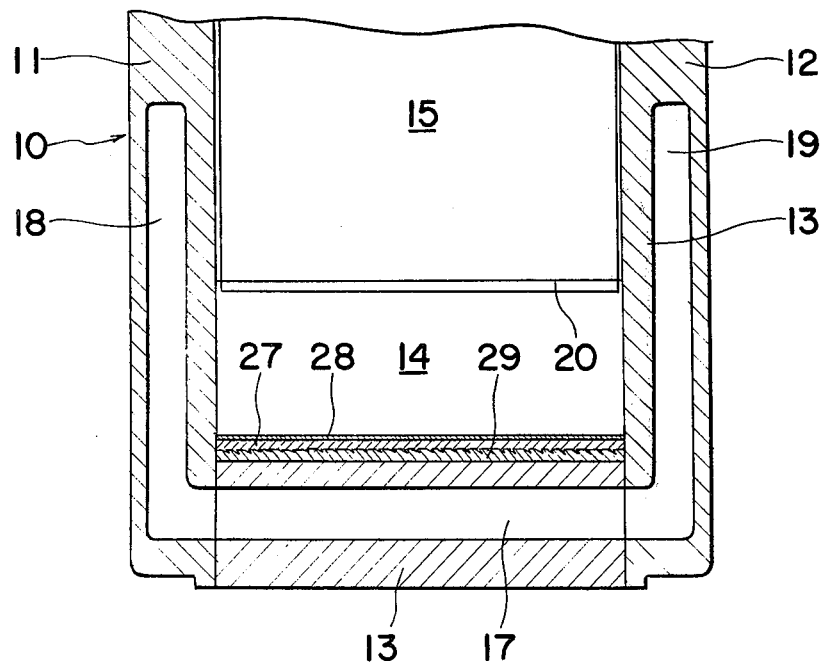
FIG. 2 is a cross sectional view, on an enlarged scale, taken along the line II—II in FIG. 1.

Referring now to the first preferred embodiment of the present invention shown in FIGS. 1 to 3, and particularly with reference to FIG. 1, the rotary piston 15 in the position shown by the solid line is positioned to define an expansion chamber of minimum volume on one of the arcuate flanks 15a to 15c of the rotary piston 15 which, as indicated by 15a, substantially faces the ignition plug 25. Geometrically, in the illustrated position of the rotary piston 15 the intermediate point of the arcuate flank 15a between the apex seals 20 and 22 is displaced in the direction of rotation of the rotary piston 15, as indicated by the arrow, a slight distance from its alignment with the minor axis drawn across the cavity between a pair of circumferentially spaced, inwardly projecting lobes 13a and 13b.

The expansion chamber, which is minimum in volume at the time of generation of a propulsive force by the combustion of the air-fuel mixture, which propulsive force is necessary to rotate the rotary piston 15 in the direction of the arrow, and at the start of the expansion stroke, attains the maximum volume at the end of the expansion stroke, that is, at the time one of the rotor apexes and, specifically, the apex seal 21, which is depicted as positioned at the start of the expansion stroke in alignment with the minor axis on one side opposed to the ignition plug 25, has been advanced, for example, approximately 90° about the axis of the power output shaft 16 and comes to a position where said apex seal 21 is aligned with the major axis with the rotary piston 15 positioned as indicated by the chain lines in FIG. 1.

With the above in mind, for the purpose of the description of the present invention, the following terms and reference characters are employed to means as follows.

Point X: The position on the epitrochoidal inner surface of the peripheral casing 13 which is aligned with the position assumed, when the expansion chamber has the minimum volume, by the apex seal 20 on the leading side of the rotor flank 15a with respect to the direction of rotation of the rotary piston 15, which rotor flank 15a defines said expansion chamber in cooperation with that portion of the epitrochoidal inner surface of the peripheral casing 13 which faces said rotor flank 15a.

Point Y: The position on the epitrochoidal inner surface of the peripheral casing 13 which is aligned with the position assumed, when the expansion chamber subsequently becomes maximum in volume during continued rotation of the rotary piston 15, by said apex seal 20, which has previously been aligned with the point X when said expansion chamber was minimum in volume, while another one of the apex seals 21 proceeding said apex seal 20 is brought into alignment with the major axis of the epitrochoidal shape of the inner surface of the peripheral casing 13.

Referring still to FIGS. 1 to 3, according to the present invention, a strip of metal having a length as will be described later is embedded at 29 in the peripheral casing assembly. More specifically, the metal strip 29 is sandwiched between the metallic liner 27 and the peripheral casing 13 in a manner which will subsequently be described in detail and has a length so as to extend between the points X and Y substantially following the curvature of that portion of the epitrochoidal inner surface of the peripheral casing 13. As best shown in the left-hand portion of FIG. 3, the metal strip 29 has one surface contacting respective tips of some of the surface irregularities 27a on the metallic liner 27 with some of the interstices being substantially unfilled with the material for the peripheral casing 13, said some of said interstices being defined by said some of said surface irregularities 27a. On the other hand, the other surface of the metal strip 29 has a plurality of surface irregularities 29a outwardly extending from said surface of said metal strip 29, which surface irregularities 29a are firmly wedged into the material for the peripheral casing 13, thereby achieving a firm mechanical interlock between the peripheral casing 13 and the metal strip 29. The surface irregularities 29a on the metal strip 29 may be the same or similar to the surface irregularities 27a on the metallic liner 27 and the material of tthe metal strip 29 may be any metallic material. However, in the embodiment shown in FIGS. 1 to 3, the metal strip 29 is prepared from an iron plate.

It is to be noted that some of the interstices defined by the surface irregularities 27a between the metallic liner 27 and said metal strip 29 constitute a heat insulating layer in the form of an adiabatic space provided according to the present invention for the purpose as hereinbefore fully discussed.

Installation of the metal strip 29 in the described position can readily be carried out during the practice of any of the foregoing methods of manufacture of the peripheral casing 13. Specifically, the desired installation of the metallic strip 29 can be achieved merely by adding to any of the foregoing methods a step of placing the metallic strip 29 on a predetermined portion of the surface-roughened surface of the metallic liner 27 prior to the aluminum alloy pouring step, which placement of said metallic strip 29 may be carried out either before the surface irregularities 29a are formed or, preferably, after said surface irregularities 29a have been formed. It is to be noted that the width of the metal strip 29 is substantially equal to or slightly smaller than the width of the epitrochoidal inner surface of the peripheral casing In order to avoid any possible, undesirable displacement of the metal strip 29 relative to the metallic liner 27, the metallic strip 29 has a plurality of through-holes 29b in any suitable pattern and each extending completely through the thickness of said metal strip 29. These through-holes 29b in the metal strip 29 allow molten metallic material for the peripheral casing 13 to penetrate therethrough during the manufacture of the peripheral casing assembly into said some of said interstices of the surface irregularities 27a which are located around the opening of the corresponding through-hole 29b in the metal strip 29. Therefore, it is clear that, where the metal strip 29 is installed, the peripheral casing 13 is mechanically interlocked with the metallic liner 27 with the metal strip 29 steadily supported by the material for the peripheral casing 13 which has penetrated through the through-holes 29b and solidified, as clearly shown in the left-hand portion of FIG. 3.

It is to be noted that although portions of said some of said interstices of the surface irregularities 27a are filled with the material for the peripheral casing 13 which has penetrated through the through-holes 29b, any appreciable reduction in performance of the heat insulating layer described above occurs because the total surface area in which the material for the peripheral casing 13 contacts the metallic liner 27 through the through-holes 29b in the metal strip 29 is very small as compared with the surface area of the metal strip 29.

While the heat insulating layer in the form of an adiabatic space defined by some of the interstices of the surface irregularities 27a which are situated between the metallic liner 27 and the metal strip 29 unfilled with the material for the peripheral casing 13 is formed at the definite position within the peripheral casing assembly as hereinbefore fully described, a similar heat insulating layer can be installed in each of the end walls 11 and 12.

It is to be noted that, to facilitate formation of the surface irregularities on the metallic liner 27, this liner 27 is preferably made of malleable metal.

Figure 4:
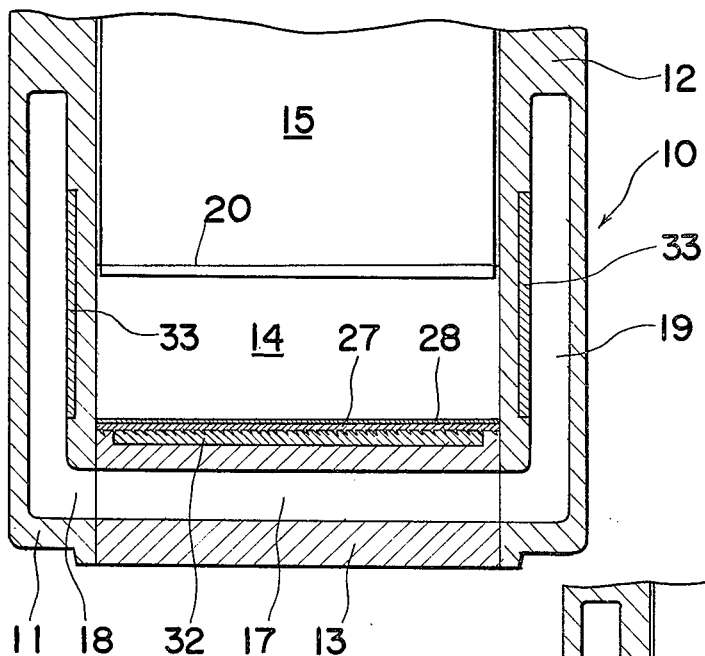
FIGS. 4 and 5 are view similar to FIG. 2, illustrating second and third preferred embodiments of the present invention, respectively.

In the embodiment shown in FIG. 4, instead of the metal strip 29 which has been described in the foregoing embodiment as used to form the heat insulating layer in the peripheral casing 13, a layer of porous metal is employed as indicated at 32. On the other hand, a similar porous metal layer can also be provided on each of the end walls 11 and 12 as generally indicated at 33. The porous metal layers 32 and 33 may, for example, be made of an aluminum alloy.

The porous metal layer 32 in the peripheral casing is situated between the metallic liner 27 with one surface secured, for example, by means of a soldering technique, to the metallic liner 27 prior to the molten material for the peripheral casing 13 being poured and subsequently solidified therearound. On the other hand, the porous metal layer 33 in each of the end walls 11 and 12 can also be installed in the end wall in a similar manner as the installation of the porous metal layer 32 and during casting thereof in a casting mold.

Because of porosities of each of the metal layers 32 and 33, they can satisfactorily and effectively serve as heat insulating layers according to the invention.

Figure 5:
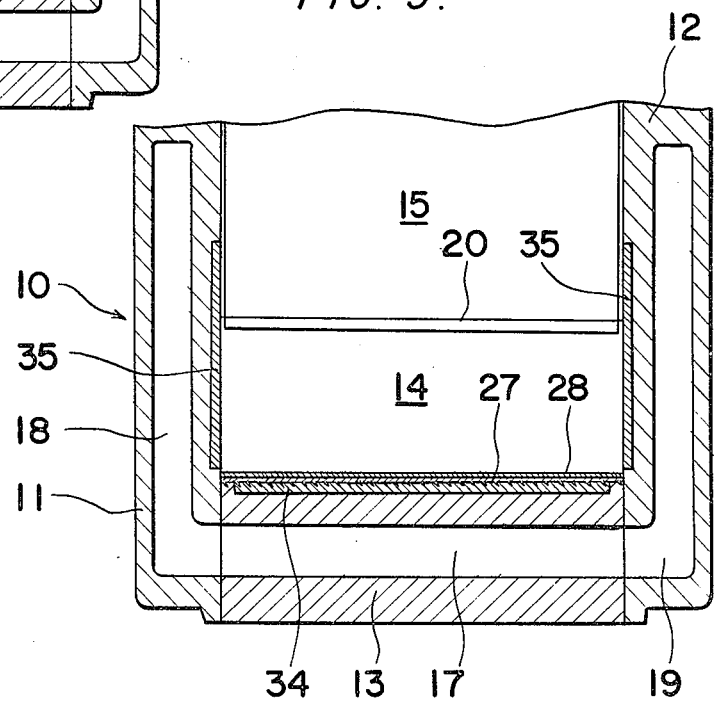

In the embodiment shown in FIG. 5, the respective heat insulating layers in the peripheral casing 13 and end walls 11 and 12 are constituted by sprayed layers 34 and 35 of heat insulating material, such as ceramic material or metallic material, for example, iron, alumina ($Al_2O_3$), zirconium oxide ($ZrO_2$) and molybdenum. The sprayed layer 34 in the peripheral casing 13 is formed by the use of any known spraying technique and, therefore, has one surface firmly interlocked with the metallic liner 27 and the other surface with the material for the peripheral casing 13. Similarly, the sprayed layer 35 in each of the end walls 11 and 12 is also formed by the use of the spraying technique and, more particularly, is formed either before or after the end wall has been cast. In the case where the sprayed layer 35 is to be formed prior to casting of the end wall, what is necessary is to spray a heat insulating material onto a mold and, thereafter, to allow the sprayed heat insulating material to be covered with the material for the end wall. On the other hand, in the case where the sprayed layer 35 is to be formed after the end wall has been completed, it is necessary to form a recess in one surface of the end wall into which a heat insulating material is subsequently sprayed.

Figure 6:
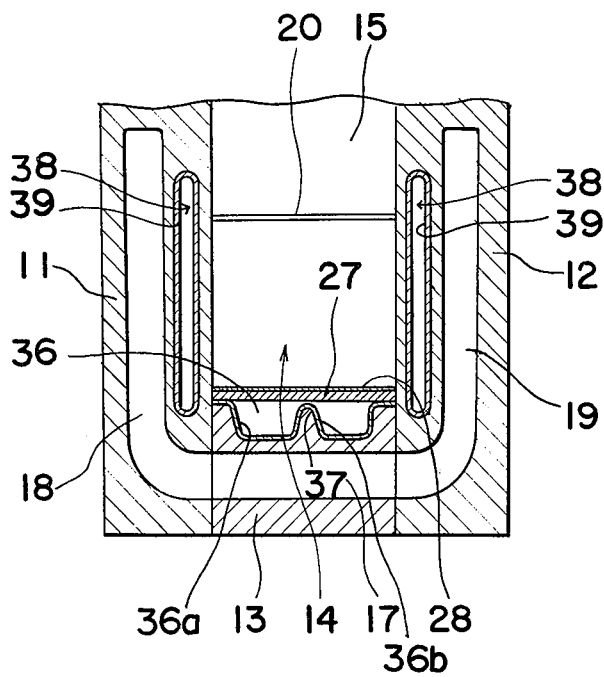
FIG. 6 is a view similar to FIG. 2, illustrating a fourth embodiment of the present invention.

Referring now to FIG. 6, the heat insulating layers in the peripheral casing 13 and end walls 11 and 12 according to the present invention are respectively constituted by adiabatic spaces.

In the peripheral casing 13, there is formed an adiabatic space 36 composed of a pair of elongated hollows 36a and 36b each extending between the points X and Y (FIG. 1) following the curvature of that portion of the epitrochoidal inner surface and being situated between the metallic liner 27 and some of the passages 17 in the peripheral casing 13. This adiabatic space 36 can readily be formed by the use of a metallic plate 37 shaped to have juxtaposed elongated recesses, which ultimately form the respective hollows 36a and 36b, said metallic plate 37 being fitted, or otherwise secured, to the metallic liner 27 prior to the material for the peripheral casing 13 being poured and subsequently solidified therearound.

In each of the end walls 11 and 12, an adiabatic space 38 is formed by embedding a core member 39 having a hollow formed therein. This core member 39 is embedded in the end wall 11 or 12 during the manufacture thereof and is positioned between some of the coolant passages 18 or 19 and the inner surface of the end wall 11 or 12.

The number of the hollows 36a and 36b may not be always limited to two such as shown in FIG. 6, but may be one or more than two.

It is to be noted that the adiabatic spaces 36 and 38 in the embodiment of FIG. 6 are positioned to cover the expansion chamber in a similar to manner as the heat insulating layers in the embodiment of FIGS. 1 to 3.

Figure 7:
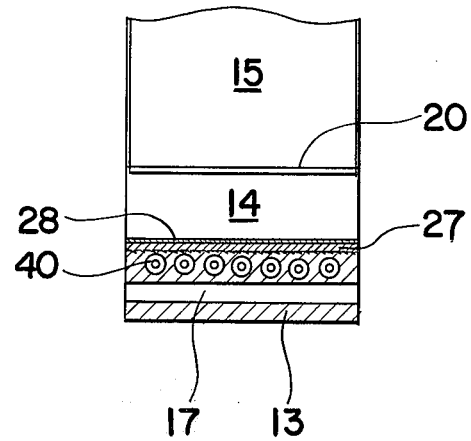
FIG. 7 is a view similar to FIG. 2, but with end walls removed, illustrating a fifth embodiment of the present invention.

In the embodiment shown in FIG. 7, the heat insulating layer in the peripheral casing 13 is constituted by a plurality of juxtaposed pipes 40 each firmly secured to, or otherwise soldered to, the metallic liner 27 and subsequently covered by the material for the peripheral casing 13.

Figure 8:
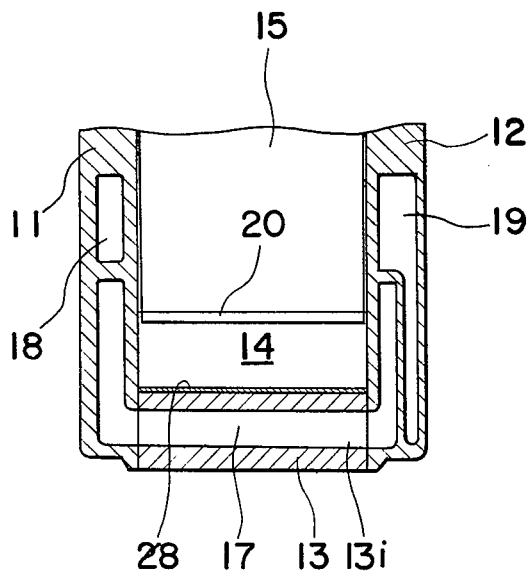
FIG. 8 is a view similar to FIG. 2, illustrating a sixth embodiment of the present invention.
Figure 9:
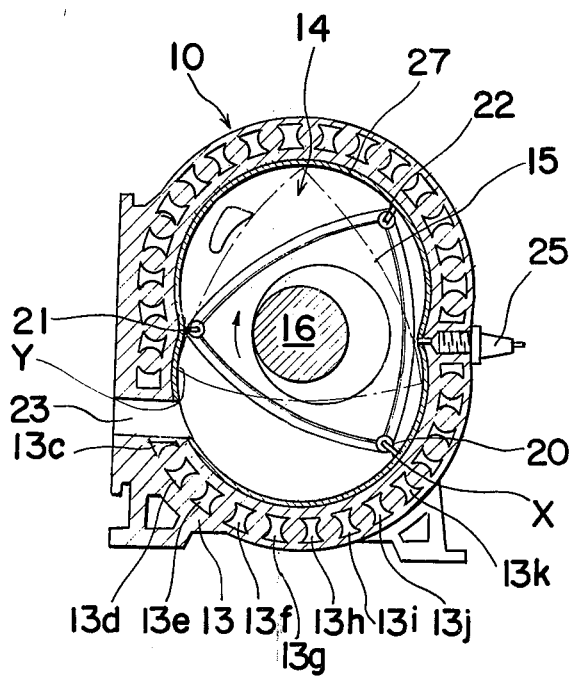
FIG. 9 is a cross sectional view, similar to FIG. 1, of the rotary piston internal combustion engine according to the sixth embodiment of the present invention.

Referring now to FIGS. 8 and 9, the present invention can also be accomplished by closing or isolating some of the coolant passages 18 and 19 in the respective end walls 11 and 12 and, in addition, isolating some of the coolant passages 17 in the peripheral casing 13 from the other coolant passages which remain and which constitute the axial-path coolant flow system in the peripheral casing 13 and end walls 11 and 12, said some of said coolant passages 17 in the peripheral casing 13 being indicated by 13c to 13k in FIG 9. In other words, some of the coolant passages in the peripheral casing 13, which are respectively indicated by 13c to 13k and which extend in side by side relation to each other which are positioned between the points X and Y, and these of the coolant passages 18 and 19 in the respective end walls 11 and 12 which are in communication with the coolant passages 13c to 13k in the preipheral casing 13 are isolated from the other coolant passages 17, 18 and 19 to provide the heat insulating layer in the form of series-communicated adiabatic passages which substantially surround the expansion chamber.

It is to be noted that all of the coolant passages in the end walls 11 and 12 which are in communication with the coolant passages 13c to 13k need not be closed, in which case only coolant passages in the respective end walls which are in communication with, for example, the alternate coolant passages 13c, 13e, 13g, 13i and 13k in the peripheral casing 13 may be closed.

Although the present invention has been fully described in conjunction with the preferred embodiments thereof, it is to be noted that various changes and modifications will be apparent to those skilled in the art. By way of example, the concept of the present invention is equally applicable to an engine housing structure for a rotary piston internal combustion engine wherein the circumferential-path coolant flow system is employed. Moreover, except for the embodiment of FIGS. 8 and 9, the heat insulating layers in the respective end walls 11 and 12 in one of the embodiments of FIG. 4, FIG. 5 and FIG. 6 can be combined with the heat insulating layer in the peripheral casing 13 in any of the other embodiments.

Therefore, these changes and modifications are to be understood as included within the true scope of the present invention, unless they depart therefrom.

What is claimed is:

1. An engine housing structure for a rotary piston internal combustion engine including a multi-lobed rotor held in position within said housing structure for eccentric rotation, said multi-lobed rotor having apex portions held in sliding contact with a trochoidal inner surface within said housing structure for successively defining intake, compression, combustion, expansion and exhaust chambers therein during eccentric rotation of said rotor, said housing structure further including intake and exhaust openings formed therein and respectively in communication with said intake and exhaust chambers, which housing structure comprises:

a peripheral casing having the epitrochoidal surface formed therein;

a pair of end walls connected to each other with said peripheral casing sandwiched therebetween to provide a cavity, said intake, compression, combustion, expansion and exhaust chambers being formed in said cavity and on a plurality of arcuate flanks of said rotor in cooperation with said trochoidal inner surface; and heat insulating means in said housing structure to prevent substantial lowering of the temperature of an exhaust gas within said expansion chamber, said heat insulating means comprising a heat insulating layer in said peripheral casing, said heat insulating layer having a length so as to extend between a first point on the trochoidal inner surface, which is aligned with the position assumed, when the expansion chamber is at the minimum volume, by one of the apex portions of the leading side of one of the rotor flanks with respect to the direction of rotation of the rotor, which one rotor flank defines said expansion chamber in cooperation with that portion of the trochoidal inner surface which faces said one rotor flank, and a second point on the trochoidal inner surface which is subsequently aligned with the position subsequently assumed, when the expansion chamber is at the maximum volume, by said one apex portion on said leading side of said one rotor flank with respect to the direction of rotation of said rotor.

2. An engine housing structure as claimed in claim 1 wherein said trochoidal inner surface is lined with a metallic liner and further comprising a plurality of juxtaposed metallic pipes embedded between said metallic liner and said peripheral casing, said metallic pipes constituting said heat insulating layer in said peripheral casing.

3. An engine housing structure as claimed in claim 1, wherein said peripheral casing and end walls have series-connected coolant passages therein for the flow of a fluid coolant, some of said coolant passages being isolated from the remaining coolant passages, said heat insulating layers in said peripheral casing and end walls being constituted by said some of said coolant passages.

4. An engine housing structure as claimed in claim 1, wherein said trochoidal inner surface is lined with a metallic liner and further comprising a metallic strip of a length so selected as to extend between said first and second points, said metallic strip being held in position between said metallic liner and said peripheral casing to define a layer of adiabatic space, said heat insulating layer in said peripheral casing being constituted by said layer of adiabatic space.

5. An engine housing structure as claimed in claim 4, further comprising a heat insulating layer formed in each of said end walls, said heat insulating layer in each of said end walls being constituted by a layer of adiabatic space which is defined between a metallic lining and a metallic plate, said metallic lining and metallic plate being cast in said end wall with said metallic plate situated between said metallic lining and said end wall, said metallic lining having one surface facing said metallic plate and the other surface held flush with an inner surface of said end wall which faces said working chambers.

6. An engine housing structure as claimed in claim 4, wherein said metallic liner has one surface formed with surface irregularities integral with and outwardly extending from the skin of said metallic liner, and said metallic strip has one surface formed with surface irregularities integral with an outwardly extending from the skin of said metallic strip, said surface irregularities on said metallic strip being substantially wedged into the peripheral casing while the other surface thereof contacts respective tips of some of said surface irregularities on said metallic liner, the remaining surface irregularities on said metallic liner being substantially wedged into the peripheral casing, said metallic strip having a plurality of through-holes each completely extending through the thickness of said metallic strip, said peripheral casing also being connected with said metallic liner through said through-holes.

7. An engine housing structure as claimed in claim 1, wherein said trochoidal inner surface is lined with a metallic liner and further comprising a layer of heat insulating material on said metallic liner and situated between said liner and said peripheral casing, said heat insulating layer in said peripheral casing being constituted by said layer of heat insulating material.

8. An engine housing structure as claimed in claim 7, wherein said heat insulating material is a porous metal.

9. an engine housing structure as claimed in claim 7, wherein said heat insulating material is selected from the group consisting of ceramic material, iron, alumina, zirconium oxide and molybdenum, and is formed by spraying the selected one of said group.

10. An engine housing structure as claimed in claim 7, further comprising a heat insulating layer in each of said end walls, said heat insulating layer in each of said end walls being constituted by a layer of heat insulating material which is embedded in said end wall.

11. An engine housing structure as claimed in claim 10, wherein said heat insulating material is a porous metal.

12. An engine housing structure as claimed in claim 10, wherein said heat insulating material is selected from the group consisting of ceramic material, iron, alumina, zirconium oxide and molybdenum, and is formed by spraying the selected one of said group.

* * * * *